United States Patent [19]

Litt

[11] Patent Number: 4,840,567

[45] Date of Patent: Jun. 20, 1989

[54] BRAILLE ENCODING METHOD AND DISPLAY SYSTEM

[75] Inventor: Timothe Litt, Waltham, Mass.

[73] Assignee: Digital Equipment Corporation, Maynard, Mass.

[21] Appl. No.: 26,108

[22] Filed: Mar. 16, 1987

[51] Int. Cl.⁴ .......................................... G09B 21/00
[52] U.S. Cl. ................................................ 434/114
[58] Field of Search ................. 434/113, 114; 340/407

[56] References Cited

U.S. PATENT DOCUMENTS

| | | | |
|---|---|---|---|
| 4,024,536 | 5/1977 | Andersson | 340/407 |
| 4,033,053 | 7/1977 | Engler | 434/114 |
| 4,266,936 | 5/1981 | Rose | 434/114 |
| 4,445,871 | 5/1984 | Becker | 434/114 |
| 4,516,939 | 5/1985 | Crimmins, Jr. | 434/114 |

Primary Examiner—Richard J. Apley
Assistant Examiner—J. Welsh
Attorney, Agent, or Firm—Nutter, McClennen & Fish

[57] ABSTRACT

A Braille display system which encodes text and displays that text on a mechanical Braille display using a three-dimensional Braille code. Each symbol of the code has four frames each of which comprises a 4X2 dot-position array. When the text first appears on the Braille display, the system initially presents the top frame of each symbol. The system also includes a frame selection control by which a user can cause each of the remaining three frames of the relevant Braille symbol to appear individually on the Braille display. When each succeeding frame appears, it replaces the preceding frame of the same symbol. Thus, by using the frame selection control, a user can examine all four frames of each symbol at his discretion.

14 Claims, 3 Drawing Sheets

| DEC | Char | Name | Braille | DEC | Char | Name | Braille |
|---|---|---|---|---|---|---|---|
| 0 | ^@ | NUL | 4,C | 16 | ^P | DLE | 1,2,3,4,C |
| 1 | ^A | SOH | 1,C | 17 | ^Q | DC1 | 1,2,3,4,5,C |
| 2 | ^B | STX | 1,2,C | 18 | ^R | DC2 | 1,2,3,5,C |
| 3 | ^C | ETX | 1,4,C | 19 | ^S | DC3 | 2,3,4,C |
| 4 | ^D | EOT | 1,4,5,C | 20 | ^T | DC4 | 2,3,4,5,C |
| 5 | ^E | ENQ | 1,5,C | 21 | ^U | NAK | 1,3,6,C |
| 6 | ^F | ACK | 1,2,4,C | 22 | ^V | SYN | 1,2,3,6,C |
| 7 | ^G | BEL | 1,2,4,5,C | 23 | ^W | ETB | 2,4,5,6,C |
| 8 | ^H | BS | 1,2,5,C | 24 | ^X | CAN | 1,3,4,6,C |
| 9 | ^I | HT | 2,4,C | 25 | ^Y | EM | 1,3,4,5,6,C |
| 10 | ^J | LF | 2,4,5,C | 26 | ^Z | SUB | 1,3,5,6,C |
| 11 | ^K | VT | 1,3,C | 27 | ^[ | ESC | 2,4,6,C |
| 12 | ^L | FF | 1,2,3,C | 28 | ^\ | FS | 1,2,5,6,C |
| 13 | ^M | CR | 1,3,4,C | 29 | ^] | GS | 1,2,4,5,6,C |
| 14 | ^N | SO | 1,3,4,5,C | 30 | ^^ | RS | 4,5,C |
| 15 | ^O | SI | 1,3,5,C | 31 | ^_ | US | 4,5,6,C |

| DEC | Char | Name | Braille | DEC | Char | Name | Braille |
|---|---|---|---|---|---|---|---|
| 32 | <space> | | No dots | 48 | 0 | | 3,5,6 |
| 33 | ! | | 2,3,4,6 | 49 | 1 | | 2 |
| 34 | " | | 5 | 50 | 2 | | 2,3 |
| 35 | # | | 3,4,5,6, | 51 | 3 | | 2,5 |
| 36 | $ | | 1,2,4,6 | 52 | 4 | | 2,5,6 |
| 37 | % | | 1,4,6 | 53 | 5 | | 2,6 |
| 38 | & | | 1,2,3,4,6 | 54 | 6 | | 2,3,5 |
| 39 | ' | | 3 | 55 | 7 | | 2,3,5,6 |
| 40 | ( | | 1,2,3,5,6 | 56 | 8 | | 2,3,6 |
| 41 | ) | | 2,3,4,5,6 | 57 | 9 | | 3,5 |
| 42 | * | | 1,6 | 58 | : | | 1,5,6 |
| 43 | + | | 3,4,6 | 59 | ; | | 5,6 |
| 44 | , | | 6 | 60 | < | | 1,2,6 |
| 45 | - | | 3,6 | 61 | = | | 1,2,3,4,5,6 |
| 46 | . | | 4,6 | 62 | > | | 3,4,5 |
| 47 | / | | 3,4 | 63 | ? | | 1,4,5,6 |

FIG. 3A

| DEC | Char | Name | Braille | DEC | Char | Name | Braille |
|---|---|---|---|---|---|---|---|
| 64 | @ | | 4 | 80 | P | | 1,2,3,4 |
| 65 | A | | 1 | 81 | Q | | 1,2,3,4,5 |
| 66 | B | | 1,2 | 82 | R | | 1,2,3,5 |
| 67 | C | | 1,4 | 83 | S | | 2,3,4 |
| 68 | D | | 1,4,5 | 84 | T | | 2,3,4,5 |
| 69 | E | | 1,5 | 85 | U | | 1,3,6 |
| 70 | F | | 1,2,4 | 86 | V | | 1,2,3,6 |
| 71 | G | | 1,2,4,5 | 87 | W | | 2,4,5,6 |
| 72 | H | | 1,2,5 | 88 | X | | 1,3,4,6 |
| 73 | I | | 2,4 | 89 | Y | | 1,3,4,5,6 |
| 74 | J | | 2,4,5 | 90 | Z | | 1,3,5,6 |
| 75 | K | | 1,3 | 91 | [ | | 2,4,6 |
| 76 | L | | 1,2,3 | 92 | \ | | 1,2,5,6 |
| 77 | M | | 1,3,4 | 93 | ] | | 1,2,4,5,6 |
| 78 | N | | 1,3,4,5 | 94 | ^ | | 4,5 |
| 79 | O | | 1,3,5 | 95 | _ | | 4,5,6 |

| DEC | Char | Name | Braille | DEC | Char | Name | Braille |
|---|---|---|---|---|---|---|---|
| 96 | ` | grave | 4,L | 112 | p | | 1,2,3,4,L |
| 97 | a | | 1,L | 113 | q | | 1,2,3,4,5,L |
| 98 | b | | 1,2,L | 114 | r | | 1,2,3,5,L |
| 99 | c | | 1,4,L | 115 | s | | 2,3,4,L |
| 100 | d | | 1,4,5,L | 116 | t | | 2,3,4,5,L |
| 101 | e | | 1,5,L | 117 | u | | 1,3,6,L |
| 102 | f | | 1,2,4,L | 118 | v | | 1,2,3,6,L |
| 103 | g | | 1,2,4,5,L | 119 | w | | 2,4,5,6,L |
| 104 | h | | 1,2,5,L | 120 | x | | 1,3,4,6,L |
| 105 | i | | 2,4,L | 121 | y | | 1,3,4,5,6,L |
| 106 | j | | 2,4,5,L | 122 | z | | 1,3,5,6,L |
| 107 | k | | 1,3,L | 123 | { | | 2,4,6,L |
| 108 | l | | 1,2,3,L | 124 | \| | | 1,2,5,6,L |
| 109 | m | | 1,3,4,L | 125 | } | | 1,2,4,5,6,L |
| 110 | n | | 1,3,4,5,L | 126 | ~ | tilde | 4,5,L |
| 111 | o | | 1,3,5,L | 127 | | <Del> | 1,2,3,4,5,6,C,L |

FIG. 3B

BRAILLE ENCODING METHOD AND DISPLAY SYSTEM

BACKGROUND OF THE INVENTION

1. Field of the Invention

This invention generally relates to Braille display systems which are used to display stored alphanumeric text in a Braille code and, more specifically, it relates to Braille display systems which incorporate a mechanical Braille display and encode the characters of the alphanumeric text as three-dimensional Braille symbols consisting of multiple frames of information.

2. Description of the Prior Art

Through the use of Braille code, people with serious visual impairments are able to read text by touch. The Braille code consists of a list of different embossed symbols, each one corresponding to a specific alphanumeric character. The embossed symbols conform to a standardized format consisting of a three by two array of dot positions. Each dot position within the array is in one of two states, either "on" or "off", depending upon the presence or absence of a raised dot. By sensing the pattern of raised dots through touch, the visually impaired person can identify the symbol and thus, the character to which it corresponds. Using this approach, the visually impaired person can tactilely read alphanumeric text which has been translated into Braille by scanning the lines of embossed symbols with his fingers.

Originally, Braille code was developed for print media. Today, however, the media for Braille have expanded to include computer display terminals as well. Special Braille display terminals are available which make it possible for visually impaired people to read text stored in a computer. The Braille display terminals convert stored computer text into Braille symbols which then appear on a mechanical Braille display. Generally, the display is a string or window of electromechanical Braille display cells. Each cell contains an array of movable pins which can be raised or lowered within the cell to create any desired pattern of raised dots on the top surface of the cell. The visually impaired person tactilely reads the Braille symbols appearing on the display. And by electronically moving the window about the stored text, the user can read the entire text.

Since Braille code was originally developed for print media, however, it proves to be not well suited for displaying the computer-stored text of today. To be well suited, the Braille display terminal should be able to "show" the visually impaired person what the sighted user sees on the screen. Unfortunately, Braille codes found in the prior art have severely limited capacity. They are adequate for encoding the limited information found in text which appears on the printed page, but they are not adequate for encoding computer-stored text which may be specially highlighted and formatted for visual display.

Since the standard Braille 3×2 array contains six dot positions, it can only provide 64 different symbols. Yet, for computer displays there are significantly more than 64 characters which must be encoded. Besides the 26 lower case alphabetic characters, there are 26 upper case characters and ten numeric characters, a total of 62 characters. Add to this list all punctuation marks and such commonly used characters as =, +, −, / (, ), $, and *, and the number already exceeds 64. Indeed, it may be desirable to represent all of the characters of the seven bit ASCII code, which is an accepted standard for computer based systems. The ASCII code contains 128 characters, requiring twice the capacity of the standard six-dot-position Braille code.

Text formatted for video display presents even greater challenges to Braille display systems. The video displayed text may contain video attributes or enhancements which convey essential information. For example, the available video attributes include double height or double width text, and bold, blinking, reverse video or underlined characters. These highlights are commonly utilized to mark special segments of text or provide indicators of areas into which the user is supposed to insert data. Typically, the video attributes are added to text by inserting "invisible" control commands in text. These commands are not printed on the video screen, only their intended effect is displayed. If the visually impaired person cannot detect the presence of these attributes, he may be unable to recognize important information or respond in the manner intended or, worse yet, he may not be able to understand the text. Thus, a Braille display system must be capable of satisfactorily identifying characters or text possessing video attributes.

In addition, computers have the capability of utilizing several different character sets. For example, besides the U.S. ASCII code there are the U.K. ASCII code and a number of other non-national character sets, as well as line drawing characters and graphics characters. A satisfactory Braille code for use on computers should be capable of identifying each of these for the visually impaired person.

The prior Braille display systems do not adequately address these needs. Either they ignore video attributes and "unusual" characters (e.g. characters from other character sets) or they do an incomplete and poor job of displaying them. The systems which do not simply ignore video attributes or "unusual" text employ one or more of the following three methods to encode text for the Braille display. One method implements a Braille code which has additional dot positions in the multi-dot array. The second method displays the control commands which turn on and off the video attributes within the text. The third method adds one or more prefix symbols to the standard Braille symbol to identify each character having special features and to identify the character set from which the characters are selected. Each of these methods has serious drawbacks.

The codes which utilize more dot positions in the array have greater capacity than the code based upon the 6-dot array but they do not have sufficient capacity to also encode video attributes and identify characters from multiple character sets. All of the expanded array codes basically utilize the same format: a standard 6-dot Braille symbol with one or two modifier dots added in a fourth row. The modifier dots indicate whether the 6-dot symbol is upper case, lower case or a control character. They adopt this format to maintain acceptable compatibility with other existing Braille codes. But because they use this format, these codes usually accommodate only the 128 characters of the ASCII character set. Thus, this approach is inadequate.

Displaying character attribute control commands and character set specifiers along with the text also yields an unsatisfactory solution. Since the highlighted words or phrases are often interspersed throughout the text, this approach leads predictably to very confusing and sometimes unreadable results on the Braille display. First, the normally desired flow of the text is destroyed by the appearance of often complicated control commands on the Braille display. Second, if the reader misses a character set specifier, the text may be unintelligible to the reader. For example, in a mathematical formula utilizing both Greek and Arabic symbols, missing a switch to the Greek character set can completely change the meaning of the formula or make it meaningless.

Another problem is that the systems do not distinguish between visual attribute control commands and other control commands. Thus, line returns, paragraph indents, and other formatting commands will also appear on the Braille display, cluttering up the text and greatly complicating the reading task for the visually impaired person. Moreover, the presence of the control commands on the Braille display disrupts the intended formatting of the text by altering the relative spatial relationship of characters within the text. Where the video screen requires only one position to describe a character along with its video attributes, the Braille display requires several. Thus data which appears in columns on the video screen, will be completely misaligned on a Braille display system that signals the presence of video attributes by displaying the control commands. In instances when preserving vertical alignment of text is especially important, such as in financial reports or balance sheets, the text appearing on the Braille display may become completely undecipherable.

For similar reasons, the third method of adding prefix symbols to standard Braille symbols is equally unsatisfactory. As just noted, using two or more Braille symbols to represent a single character of video displayed text alters the relative spatial relationship of the characters in the text. When "seeing" a properly formatted display is essential to understanding the text, this alteration is unacceptable.

One objective of this invention is to provide a Braille display system which implements a Braille code having sufficient capacity to encode the range of characters and symbols utilized in text created for video display.

Another objective of this invention is to provide a Braille display system which displays text in a Braille code and, in the displayed text, preserves the relative spatial relationships of the characters as they would exist on a video screen display of the same text.

Other objects either are stated in the following description or will become evident in view of the description of the succeeding illustrative embodiment.

SUMMARY OF THE INVENTION

In accordance with these objectives, the invention is a Braille display system which encodes text and displays that text on a mechanical Braille display using a three-dimensional Braille code. Each symbol of the code has four frames each of which comprises a 4×2 dot-position array. When the text first appears on the Braille display, the system initially presents the top frame of each symbol. The system also includes a frame selection control by which a user can cause each of the remaining three frames of the relevant Braille symbol to appear individually on the Braille display. When each succeeding frame appears, it replaces the preceding frame of the same symbol. Thus, by using the frame selection control, a user can examine all four frames of each symbol at his discretion.

Within each three-dimensional Braille symbol, the description of the character in text is hierarchically ordered among the frames. The objective of the ordering is to minimize the number of frames which a user needs to examine in order to read and understand most kinds of text. The top frame, using a conventional Braille code which is compatible with other Braille codes found in the prior art, presents a modified ASCII representation of the character located at a specified position in text. The remaining three frames of each symbol further describe the character at the specified position, including such parameters as video attributes, size and character set identifiers. Thus, if a user is reading text containing only standard ASCII characters with no special video attributes, he can fully understand the text by examining only the top frames of the symbols.

In addition, the upper frames in the three-dimensional Braille symbol indicate whether the reader needs to examine lower frames in order to understand the character. The top frame flags the character if it has non-standard video attributes or is in other ways unusual. And, if the character comes from a non-standard character set, the second frame notifies the user that he must sense subsequent frames to learn the identity of the non-standard character set. Thus, with this previewing feature, the user need not examine lower frames to learn if they contain additional useful information and he can thus make an informed decision as to whether to examine the lower frames.

By using three-dimensional Braille symbols, the Braille display system embodying the invention achieves two objectives which have been incompatible in prior systems. First, it displays substantially all of the information necessary to describe a character as it appears in text on a video display and, at the same time, it preserves among the characters presented on the Braille display the relative spatial relationships that exist among those same characters when they are displayed on a video screen.

With this display system the visually impaired user can read stored text and use applications programs which were essentially inaccessible to him under the prior systems. Video attribute information and character set identifiers which may be essential for understanding and using the stored text, are not ignored by the Braille display system. Yet, the character attribute information and the character set identifiers are not interspersed throughout the text so that they interfere with the reading process. In comparison with prior Braille display systems, the system embodying the invention presents the visually impaired person with a more accurate display of the text, i.e. as it will appear on the video screen to the sighted person.

BRIEF DESCRIPTION OF THE DRAWINGS

This invention is pointed out with particularity in the appended claims. Other objects and advantages of the invention may be better understood by referring to the following detailed description, taken in conjunction with the accompanying drawings, in which:

FIGS. 3A and 3B present a Braille code representation of the U.S. ASCII characters which is utilized within the three-dimensional Braille symbols embodying the invention.

DESCRIPTION OF THE PREFERRED EMBODIMENTS

Figure 1:
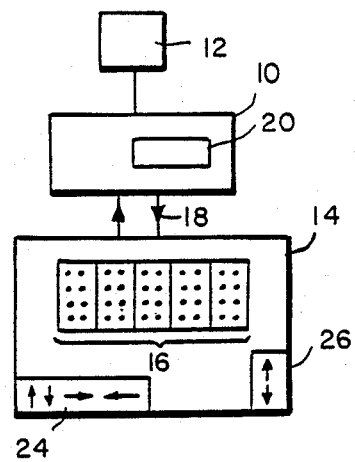
FIG. 1 is a block diagram of a Braille display system embodying the invention.

As illustrated in FIG. 1, a Braille display system which embodies the invention comprises a digital data processor 10 for storing and processing alphanumeric text which may be formatted for visual display on a video screen 12. Each position within the stored text contains a character which comes from an identifiable character set and may possess identifiable attributes or enhancements which determine how that character will be displayed on the video screen 12. The Braille display system also comprises a mechanical Braille display 14 for displaying the text in a Braille code. The Braille display 14 includes a string of electro-mechanical Braille cells 16 which generate Braille indicators comprising an array of raised dots in response to an actuation signal 18 provided by the digital data processor 10.

Typically, the digital data processor 10 stores in a random access memory 20 the text which is to be displayed on the mechanical Braille display 14. The memory locations occupied by the stored text represent a virtual display screen and the string of Braille cells 16 on the Braille display represents a window through which segments of the virtual screen can be viewed. Circuitry of the digital data processor 10 and associated software, known to those skilled in the art, give the user the ability to effectively move the window about the virtual screen by means of cursor controls 24, thereby to view all of the stored text.

Figure 2:
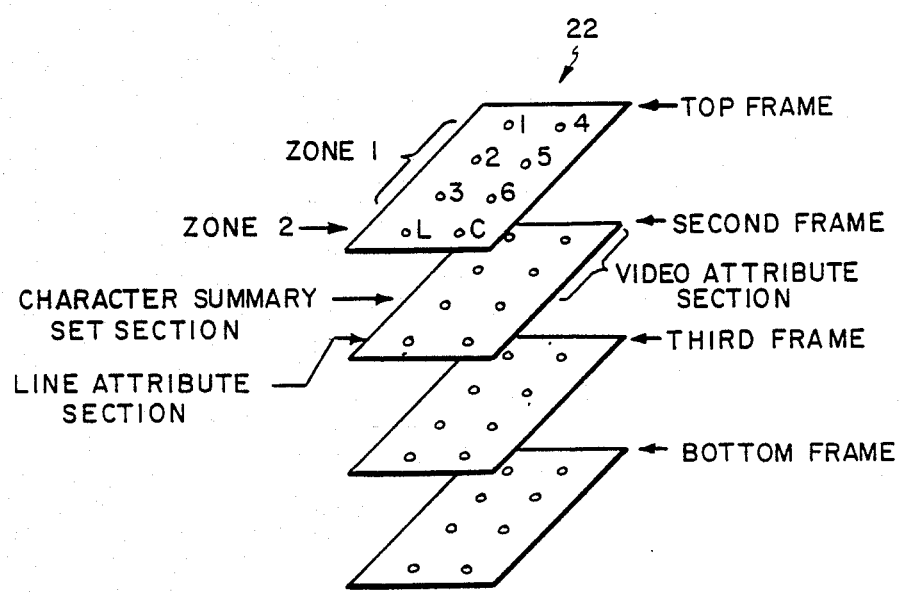
FIG. 2 is a representation of a three-dimensional Braille symbol which is used to encode information in a Braille display system which embodies the invention.

The digital data processor 10 also includes circuitry and associated software which encodes the description of the contents of each position within the stored text as a three-dimensional Braille symbol 22 (Refer to FIG. 2). The Braille symbol 22 comprises four frames, each of which is a 4×2 array of dot positions. These frames include a top frame 22a, a second frame 22b, a third frame 22c, and a bottom frame 22d. In each frame a dot position is either "on" or "off" depending upon the presence or absence of a raised dot. Each of the frames 22a-d contains information describing the character located at a specified text location. Each Braille symbol 22 occupies a single cell 16 on the Braille display 14. When a selected segment of the stored text is initially displayed on the Braille display 14, the top frames 22a of the relevant Braille symbols 22 first appear on the Braille cells 16.

The processor 10 also includes frame selection means 26 which can cause the different frames 22a-d of the Braille symbol 22 to appear on a Braille cell 16 one at a time. By using the frame selection means 26, the user can examine the remaining three frames 22b-d in succession, each succeeding frame replacing the previously displayed frame on the Braille display cell 16. Of course, for more complex character or attribute sets, or for other languages more than four frames may be used. Likewise for less complex character or attribute sets, fewer than four frames may be used.

A visually impaired person uses the system to read stored text in the following way. The reading cursor controls 24 select a segment of the stored text for viewing at the mechanical Braille display 14. In essence, the Braille symbols 22 corresponding to the characters of the stored text appear on the string of Braille cells 16, each symbol occupying a single cell of the display 14. Initially, only the top frames 22a of the relevant Braille symbols 22 appear on the display 14. The remaining frames 22b-d effectively lie beneath the corresponding cell and can be viewed by using the frame selection means 26 to move the window through the stack of frames, frame by frame.

The contents of each location in the stored text appears as a single Braille symbol 22 on the display 10. Each symbol 22 contains a substantially complete description of the character located at the specified location in the text, including the video attributes of the character as well as a character set identifier. Since each position in the text as it is displayed on a video screen is described by a single Braille symbol 22, the relative spatial relationship of the characters in video display 12 of the text are preserved when the same text is displayed on the Braille display 14. Data which appeared in aligned columns on the video screen will still appear as aligned columns of data on the Braille display 14 even if the data has associated video attributes.

Within each Braille symbol 22, the character information is hierarchically ordered among the four frames 22a-d. Although there is a range of alternatives for distributing the character information within the frames 22a-d, I have selected an ordering which is designed to achieve the following objectives. The ordering which I selected facilitates the reading of text in Braille, it minimizes the need to examine frames beyond the top frame 22a it minimizes the number of frames which need to be examined and it simplifies the code. In addition, upper frames 22a and 22b contain a preview of the information which is contained in succeeding frames. The preview information notifies the user that the character has unusual features which are further described in lower frames 22b-d.

For purposes of the following description of the frames 22a-d within the Braille symbol 22, the dot positions are labeled as illustrated in FIG. 2. The first column of the 4×2 array comprises dot positions 1, 2, 3, and L. The second column comprises dot positions 4, 5, 6, and C.

The top frame 22a is a character summary frame and it is encoded as illustrated in FIGS. 3A and 3B. It is divided into two zones: the first zone contains dot positions 1 through 6 which present a standard Braille code for the character; and the second zone contains dot positions L and C which modify the information presented in the first zone. Of course, a number of different conventions for defining the significance of the L and C dot positions may be used, the choice depends upon the application. In this embodiment, however, the following convention was selected If neither L nor C are raised, the character is an ordinary Braille character compatible with the standard 3×'array codes in the prior art. Generally speaking, if L is raised and C is not, the character is lower case; and if the C is raised but L is not, the character is a control character. Typically, control characters are not displayed on a video screen but instruct the screen or another output device to perform some task such as moving a cursor to the left margin. If both L and C are raised, the character is "unusual" and cannot be completely identified by the top frame 22a. "Unusual" means that the character has video attributes, that it is double width or double height or that it is from another character set. If both L and C are raised, the user will have to view another frame to determine what is "unusual" about the character.

The second frame 22b is a character attribute frame and it further identifies the character. The frame 22b is organized into three distinct sections: a video attribute section, a character set summary section and a line attribute section. The video attribute section comprises dot positions 1, 2, 4 and 5 and each dot position in that section signals the presence of a specific video attribute. If dot position 1, 2, 4 or 5 is on, the video attribute is bold, blinking, reverse video or underscored, respectively. Accordingly, if both dot positions 1 and 7 are on, then both bold and blinking are present.

The character set summary section comprises dot positions 3 and 6. This section not only indicates the character set from which the character is selected but it also provides a preview of the fourth frame 22d in the Braille symbol 22. If neither of these dot positions is on, then the character set is a default national character which is this instance is the U.S. ASCII character set. If only dot position 3 is on, characters are from a line drawing character set. If only dot position 6 is on, characters are from an alternative national character set such as the U.K. ASCII character set. And, if both dot positions 3 and 6 are on, then characters come from another optional character set which is further specified in the fourth frame 22d.

The line attribute section comprises the remaining two dot positions, L and C. This section indicates if the line is double height or double width and whether the display is presenting the top half of a double height line or the bottom half. If both dot positions are off, the line is single height. If only dot position L is on, the line is single height, double width. If only dot position C is on, the line is double height, top half. And if both dot positions are on, the line is double height bottom half.

The third frame 22c is an ASCII code frame. It displays the full indicator for the ASCII character which is precisely the entry found in the chart illustrated in FIGS. 3A and 3B. This frame often duplicates information displayed in the top frame 22a except in the following situation. If, for example, the character has a video attribute, then both the L and C dot positions in the top frame 22a are on. In that case, the top frame cannot unambiguously identify the ASCII character being displayed. For example, if the character is a bold lower case "a", the raised dot pattern in the top frame 22a would be 1, L, C. As noted, both the L and C dots are on. Consequently, the top frame 22a cannot distinguish whether the character is "A", "a" or "SOH". The L and C dot positions in he third frame 22c are not used to preview the bottom frame 22d, so the third frame 22c can unambiguously identify which ASCII character is being displayed.

Finally, the fourth frame 22d is a character set specifier frame. It contains the ANSI/ISO registered character set designator for the character set to which the character belongs.

The Braille display system displays text formatted for a video display in the following manner. By means of the reading cursor controls 24, a user selects the segment of text which he wants to appear on the mechanical Braille display 14. The top frames 22a of each of the Braille symbols 22 representing the characters in the selected segment appear as a sequence of 4×2 indicators on the display 14. If, for example, the characters in the segment are underlined, then the bottom two dot positions of the 4×2 array in each display cell, dot positions L and C, will be on. This indicates that the characters are unusual and cannot be fully described by the top frame 22a. To learn more about the character, the user must examine the lower frames.

By using the frame selection means 26, the user can call up the other frames 22b–d one by one, each subsequent frame replacing the preceding frame. When the second frame 22b appears, it will indicate the presence of video attributes. If the characters are normal except for the underlining, that is if they are from the U.S. ASCII character set and are of normal height and width, then only dot position 5 of the second frame 22b will be on. At that point, if the user does not know by the context whether the character is upper case, lower case or a control character, then he can call up the third frame 22c by again using the frame selection means 26. In that frame the character is fully identified according to the table in FIG. 3. Since the character is from the U.S. ASCII set, there will be no need to examine the bottom frame 22d. Indeed, the character set summary section of the second frame 22b indicates to the user that it is unnecessary to examine the fourth frame 22d.

This example also illustrates another advantage of this system. Even though characters in text may have video attributes, the user does not have to examine the second frame 22b of each symbol to learn what the video attributes are. Once he learns that underlining is present on the first characters in a line of text, he might assume that subsequent characters of text which also have both L and C dot positions on in the top frames 22a are also underlined. And when those dot positions turn off on later characters of text, that suggests that the underlining has ended. Consequently, the user need not spend time examining lower frames 22b–d of subsequent symbols and he can read the text more quickly with no real loss of information.

I claim:

1. A system for displaying text in Braille code, said text having characters with video attributes and being formatted for a visual presentation in which the characters have a predetermined relative spatial relationship with each other, said system comprising:

A. a digital data processor for storing and processing said text;

B. A Braille display terminal having an electromechanical Braille display cell for displaying Braille code;

C. cursor control means for selectively identifying a position in said text and the character located at said position, including attributes of said character;

D. first control means for hierarchically ordering a description of the identified character into a plurality of frames of information, said plurality of frames including a top frame and a bottom frame, wherein said top frame appears on the Braille display cell when said character is caused to be displayed on said display cell; and E. frame selection means for causing a successive frame of said plurality of frames t be displayed on said Braille display cell whereby said successive frame replaces the frame previously displayed on said display cell, whereby a substantially complete description of any character of text and its associated attributes can be displayed on a said Braille display cell by using said cursor control means to identify the position in text and then using said frame selection means to individually display the plurality of levels of information and whereby the formatting and relative spatial relationship of the characters in the displayed text are substantially preserved.

2. The system as defined in claim 1 wherein the top frame comprises a 4×2 dot-position array.

3. The system as defined in claim 2 wherein the first three rows of the 4×2 dot-position array present a standard Braille code for the character.

4. The system as defined in claim 1 wherein the top frame presents a standard Braille code for the character.

5. The system as defined in claim 1 wherein the fourth row of the 4×2 dot-position array previews information contained in other frames.

6. The system as defined in claim 1 wherein the plurality of frames consist of four frames in which the top frame is a first frame and the bottom frame is a fourth frame.

7. The system as defined in claim 6 wherein the second frame presents information about the video attributes of the character.

8. A method of encoding and displaying text on an electro-mechanical Braille display, said text having characters with video attributes and being formatted for a visual presentation in which the characters have a predetermined relative spatial relationship with each other, said method comprising steps of:

A. hierarchically ordering a description of each character into a plurality of frames of information, said plurality of frames having a top frame and a bottom frame;

B. displaying said top frame of the description of the character when said character is first caused to be displayed on said display;

C. individually on the Braille display replacing the displayed frame of said character with a succeeding frame of said plurality of frames; and D. repeating step C until all of the frames of the description of the character have been displayed, whereby the formatting and relative spatial relationship of the characters in the displayed text are substantially preserved when said text is displayed on said Braille display and the description of each character can be fully communicated by first displaying said top frames and then individually displaying successive frames until all frames have been displayed.

9. The method of claim 8 wherein the top frame comprises a 4×2 dot-position array.

10. The method of claim 9 wherein the first three rows of the 4×2 dot-position array present a standard Braille code for the character.

11. The method of claim 9 wherein the fourth row of the 4×2 dot-position array previews information contained in other frames.

12. The method of claim 8 wherein the top frame presents a standard Braille code for the character.

13. The method of claim 8 wherein the plurality of frames consists of four frames wherein the top frame is a first frame and the bottom frame is a fourth frame.

14. The method of claim 13 wherein the second frame presents information about the video attributes of the character.

* * * * *